(12) United States Patent
Wicker

(10) Patent No.: US 9,372,361 B2
(45) Date of Patent: Jun. 21, 2016

(54) POLARIZATION DECODER

(75) Inventor: Kenneth M. Wicker, Honeoye Falls, NY (US)

(73) Assignee: Document Security Systems, Inc., Rochester, NY (US)

(*) Notice: Subject to any disclaimer, the term of this patent is extended or adjusted under 35 U.S.C. 154(b) by 539 days.

(21) Appl. No.: 13/697,478

(22) PCT Filed: May 10, 2011

(86) PCT No.: PCT/US2011/035972
§ 371 (c)(1),
(2), (4) Date: Mar. 4, 2013

(87) PCT Pub. No.: WO2011/143253
PCT Pub. Date: Nov. 17, 2011

(65) Prior Publication Data
US 2013/0155352 A1    Jun. 20, 2013

Related U.S. Application Data

(60) Provisional application No. 61/333,989, filed on May 12, 2010.

(51) Int. Cl.
*G02F 1/1335*    (2006.01)
*G09F 9/35*    (2006.01)
*G09F 19/12*    (2006.01)
*G02B 5/30*    (2006.01)

(52) U.S. Cl.
CPC .......... *G02F 1/133528* (2013.01); *G09F 9/35* (2013.01); *G09F 19/12* (2013.01); *G02B 5/3025* (2013.01); *G02F 2001/133538* (2013.01); *G02F 2203/62* (2013.01)

(58) Field of Classification Search
CPC ................................. G02F 1/133528
See application file for complete search history.

(56) References Cited

U.S. PATENT DOCUMENTS

| | | |
|---|---|---|
| 5,691,788 A | 11/1997 | Kim |
| 6,262,782 B1 | 7/2001 | Yamazaki et al. |
| RE37,377 E | 9/2001 | Gunjima et al. |
| 2003/0017856 A1* | 1/2003 | Kotchick et al. .............. 455/566 |

OTHER PUBLICATIONS

International Search Report and Written Opinion of International Application No. PCT/US2011/035972 dated Nov. 13, 2012 (mailed Nov. 22, 2012).

* cited by examiner

*Primary Examiner* — Richard Kim
*Assistant Examiner* — Kendrick Hsu
(74) *Attorney, Agent, or Firm* — McDonnell Boehnen Hulbert & Berghoff LLP

(57) ABSTRACT

At least a portion of a polarizing layer in the display screen is omitted or removed to temporarily disable image generation but an equivalent polarizing layer is used as a replacement or as a substitute for enabling the display of images on the screen. For instance, the omitted or removed polarizing layer can be replaced in situ or a remote polarizing layer can be substituted through which the images on the display can be seen. The selective reassembly of the display can be used for purposes of security or promotion.

16 Claims, 5 Drawing Sheets

POLARIZATION DECODER

CROSS REFERENCE TO RELATED APPLICATIONS

This application is a U.S. national phase application of International Patent Application No. PCT/US2011/035972, which claims priority to U.S. Provisional Patent Application No. 61/333,989, filed May 12, 2010, the contents of each are incorporated entirely herein by reference.

TECHNICAL FIELD

The invention relates to the technical field of polarization management, particularly with respect to liquid crystal displays (LCD's) for selectively forming images as well as with respect to the use of polarization for influencing appearance.

BACKGROUND OF THE INVENTION

Liquid crystal displays (LCD's) are well known and typically used as visual display screens for numerous devices such as laptop (notebook) computers, personal digital assistants (PDAs), camera screens, cell phones, camcorders, DVD players, electronic game devices, or navigation screens, and can generally successfully operate in high-brightness environments, such as in a car, plane, boat, or a room with windows. LCD's can be arranged as transmissive backlit devices, reflective front-lit devices, or transitional hybrid devices. All three types have at least one polarizing layer that selectively allows light (either monochrome or selective colors) to pass there through to form images on the LCD screen.

Typically, two electrode layers supported on glass substrates straddle a liquid crystal layer. The liquid crystals of the liquid crystal layer are arranged together with electrodes from both electrode layers in a matrix of individually controllable cells. Both substrates also support polarizing filter films. Local electric fields generated by electrode pairs associated with each cell twist the intervening liquid crystals to rotate polarization of light passing through the crystals. One of the polarizing filter films admits polarized light into the crystals and the other polarizing filter film either passes or blocks the further passage of the light depending on the polarization state of light transmitted through the liquid crystals. For producing color images, a color filter array is mounted on one of the substrates, and individual cells within defined groups are aligned with different color filters (e.g., red, green, blue). Each such group forms a pixel, and the polarization states of the cells within each group can be controlled for forming pixels having individually addressable colors.

SUMMARY OF THE INVENTION

The present invention among its embodiments incorporates a LCD display screen that can be viewed selectively by omitting or removing at least a portion of a polarizing layer in the display screen to temporarily disable image generation and by either actively replacing the omitted or removed polarizing layer or actively substituting therefor an equivalent polarizing layer for enabling image generation within the display screen. Image generation in a similarly disabled LCD device can be enabled, for example, by replacing the polarizing layer in situ, by viewing the display screen through a remotely supported polarizing layer (e.g., a hand-held reader or polarizing glasses), or by illuminating the display screen with polarized light (e.g., a polarizing filter built into a remote light source, such as a flashlight, and projected toward the display screen).

One embodiment of the invention relates to a liquid crystal display (LCD) computer monitor screen having a designated area that is intended to be viewable only by authorized viewers. Within the designated area, the LCD screen is modified by removing (or initially omitting) one or both of an inner polarizer and an outer polarizer (e.g., inner and outer polarizing films) that straddle an addressable liquid crystal layer of the screen. Once the one or more polarizers are removed, changes in the orientation of the liquid crystals within the addressable liquid crystal layer produce no appreciable changes in the display appearance. However, authorized viewers can be provided with one or more related polarizers to restore functionality to the LCD screen. For example, paired polarizers can be coupled together at one end to preserve a polarization orientation matching the relative orientations of the removed (or omitted) polarizers. Generally, this involves an orthogonal cross-polarization orientation. With an entrance space formed through a periphery of the LCD screen, the paired polarizers can be inserted as a key straddling the addressable liquid crystal layer so that images generated by the addressable liquid crystal layer can be seen in the designated area of the screen. Just one or the other of the inner or outer polarizers could be removed (or omitted), and a related single polarizer could be arranged as a key insertable through a similar entrance space to restore functionality to the LCD screen.

Another embodiment of the invention features the incorporation of a polarizer into a branded item such as a product package or promotional material, preferably located in or near a retail space at which the product packages are on display for sale or promotion. In addition, an LCD monitor screen is modified by removing (or omitting) all or a portion of a polarizer required for producing images on the screen. However, the polarizer incorporated into the product package or promotional material can be related to the removed (or omitted) polarizer (e.g., having matching linear polarization, picked up together with the product package or promotional material, and oriented by a customer for viewing video images generated by the LCD monitor screen. The customer is rewarded with a unique experience and access to information denied to other customers without similarly equipped product packages or promotional material in hand. The product marketer is rewarded with direct access to individual customers with their products or promotional materials (e.g., advertizing materials) already in hand.

Once so engaged with customers, other interactive communications are also made possible. For example, to initiate an advertizing message in the LCD monitor screen, the branded item incorporating the polarizer can also incorporate an RFID (Radio Frequency Identification) tag. An RFID reader can be linked to the LCD screen to initiate the advertizing message when the branded item is moved into a designated area near the LCD screen. Different RFID tags can be associated with different products so that the advertizing message that is initiated can be matched to the product or product related material (i.e., the branded item) that is moved into the designated area. Different LCD screens or different areas of the LCD screens can have differently oriented polarizers matched to differently oriented polarizers incorporated into the branded item so that more than one advertizing message can be simultaneously viewed, each triggered by a different RFID tag. The same advertizing message can be repeated in a continuous loop until the advertizing message has been displayed in its entirety one or more times for each related RFID tag equipped branded item entering the designated area.

BRIEF DESCRIPTION OF THE DRAWING FIGURES

DETAILED DESCRIPTION OF THE INVENTION

Figure 1:
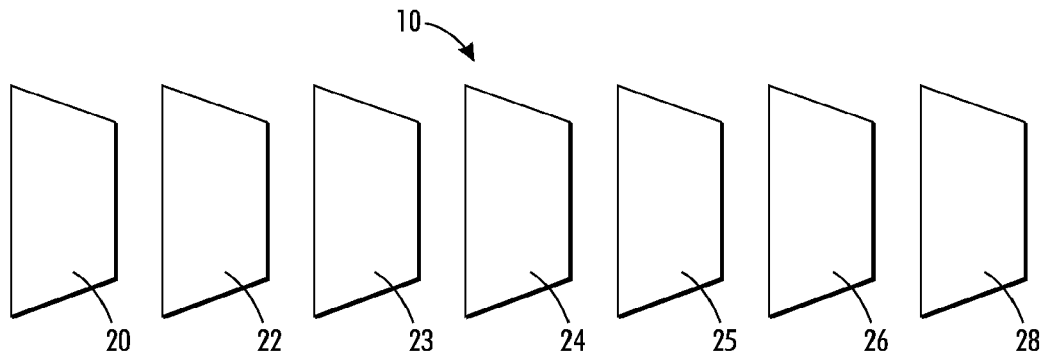
FIG. 1 is an exploded side view schematically illustrating layers of a typical LCD display device known in prior art.

Referring now to embodiments of the invention in more detail, FIG. 1 shows an exploded view of a typical LCD display device 10. Layer 20 in the back of the display device 10 can be either a reflective surface in the case of a reflective (front-lit) LCD display device or a light source in the case of a transmissive (backlit) display device. For a transitional hybrid LCD display device, the reflective surface layer 20 can be both partially reflective and partially transmissive and be backed by a light source.

Inner polarizer layer 22 (e.g., a polarizing film) selectively transmits polarized rays in particular polarization state, e.g., linearly polarized light in a given orientation. Liquid crystal layer 24 is divided into an array of individually addressable pixels, each of which can include a plurality of addressable cells for color shading. Electrode layers 23 and 25 straddle the liquid crystal layer 24 for selectively rotating the polarization of light passing through individual pixels within the liquid crystal layer 24. Color filter layer 26 preferably includes an array of filters organized by pixel for supporting color images. An outer polarizer layer 28 selectively transmits polarized rays in a given angular orientation, preferably orthogonal to the polarization orientation of the layer 22. Although not shown, the electrode layer 23 and the inner polarizing layer 24 are preferably supported by a first substrate, and the electrode layer 25 and the outer polarizing layer 28, as well as the color filter layer 26, are preferably supported by a second substrate, which substrates can be made of glass or other transmissive substances. In the preferred arrangement, only those pixels associated with rotated liquid crystal cells transmit light through both polarizing layers 22 and 28. Alternatively, light can be transmitted through both polarizing layers 22 and 28 except for those pixels associated with rotated liquid crystal cells.

Figure 2A:
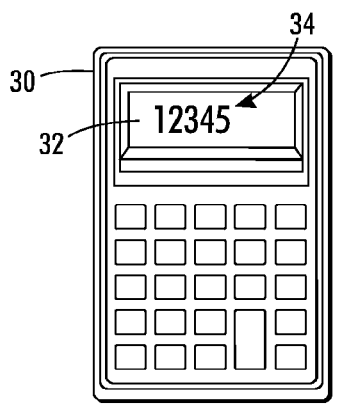
FIGS. 2a and 2b are front views of a typical device with and without paired polarizing layers straddling a LCD layer of a display.
Figure 2B:
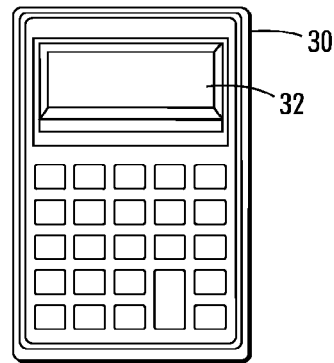

FIG. 2a illustrates a device 30, such as a calculator, having a typical LCD display 32 within which a viewable image 34 is displayed. FIG. 2b illustrates the same device 30 in which one of the polarizing layers is removed (or omitted) from the LCD display 32. In the modified device 30 of FIG. 2b the images 34 that might otherwise be formed by patterns of relatively rotated liquid crystals lack contrast and remain practically invisible. For example, if an outer polarizer is removed, both the light that is linearly polarized by the inner polarizer and the light that is polarization rotated by the liquid crystal layer are visible with little appreciable contrast between the two polarizations.

Figure 3:
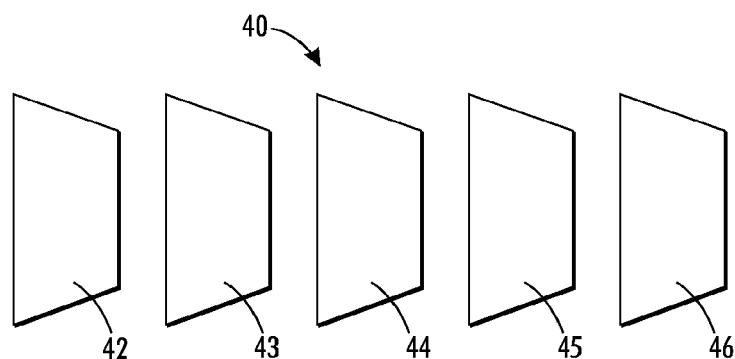
FIG. 3 is a similar exploded side view of a LCD display device of the present invention having one of the polarizing layers removed.

FIG. 3 illustrates an exploded view an embodiment of the invention operating under similar principles. An LCD display 40, such as might be incorporated into the display device 30, is manufactured without one of the polarized layers or one of the layers is removed from the manufactured LCD display 40. The modified LCD display 40 can include a first inner polarizing layer 42 that selectively transmits polarized rays in one orientation such as from a backlit source or a reflector. A liquid crystal layer 44 is divided into an array of individually addressable pixels (or the cells within each pixel). Electrode layers 43 and 45 selectively rotate the polarization of light passing through the individual pixels (or the cells of each pixel) within the liquid crystal layer 44. Color filter layer 46 can comprise an array of color filters for color LCDs. Missing from this combination of layers is a second polarizing layer adjacent the electrode layer 45 necessary for converting the relatively rotated liquid crystal patterns into images. For transmissive or transitional LCD displays, the polarizing layer 42 could be preceded by a light source. For reflective LCD displays the polarizing layer 42 could be preceded by a reflector, and for transitional LCD displays the reflector would be both partially reflective and partially transmissive. Transmissive substrates straddling the liquid crystal layer could also be used for supporting the polarizing layer 42, the two electrode layers 43 and 45, and the color filter layer 46.

Figure 4:
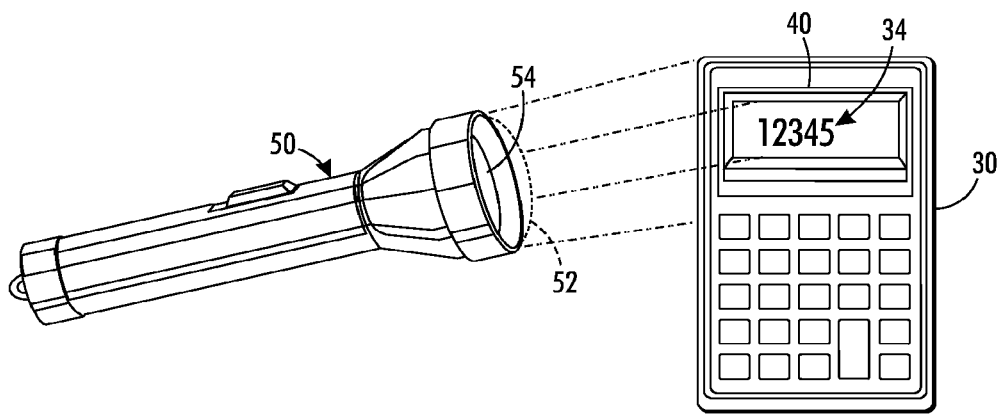
FIG. 4 is a front view of a LCD display device with a polarizing layer removed and placed on a flashlight for illuminating the display.

FIG. 4 illustrates a visual aid 50 intended for use with the modified LCD display 40. The visual aid 50 contains a polarizing layer 52 that selectively transmits polarized rays in a particular orientation as a substitute for the missing polarizing layer of the LCD display 40. The visual aid 50 together with the polarizing layer 52 can be oriented through a range of angles with respect to the polarization orientation of the polarizing layer 42 including an orientation within an orthogonal plane that completes the image of the LCD display 40.

The visual aid 50 can take the form of a flashlight in which the polarizing layer 52 located between a light source 54 and the liquid crystal layer 44 of the modified LCD display 40. Preferably, the polarizing layer 52 is adhered to or integrally formed with a flashlight lens cover 56. In a reflective (front-lit) configuration in which the polarizing layer 42 is backed by a reflector, images are formed by light that transmits through both polarizing layers 42 and 52 (as regulated by addressable patterns within the LCD layer 44) en route to and from the reflector. The visual aid 50 could also be used in conjunction with a transmissive (backlit) LCD device. An outer polarizing layer (not shown) would be incorporated the modified LCD display 40 in place of the inner polarizing layer 42, and the polarizing layer 52 of the visual aid 50 would replace the polarizing layer 42 for restoring functionality to the LCD display 40. By shining light from the visual aid 50 on the back of the further modified display 40, transmissions of light through the polarizing layer 52, the addressable LCD layer 44, and the substituted outer polarizing layer (not shown) form images apparent at the front of the display 40.

Figure 5:
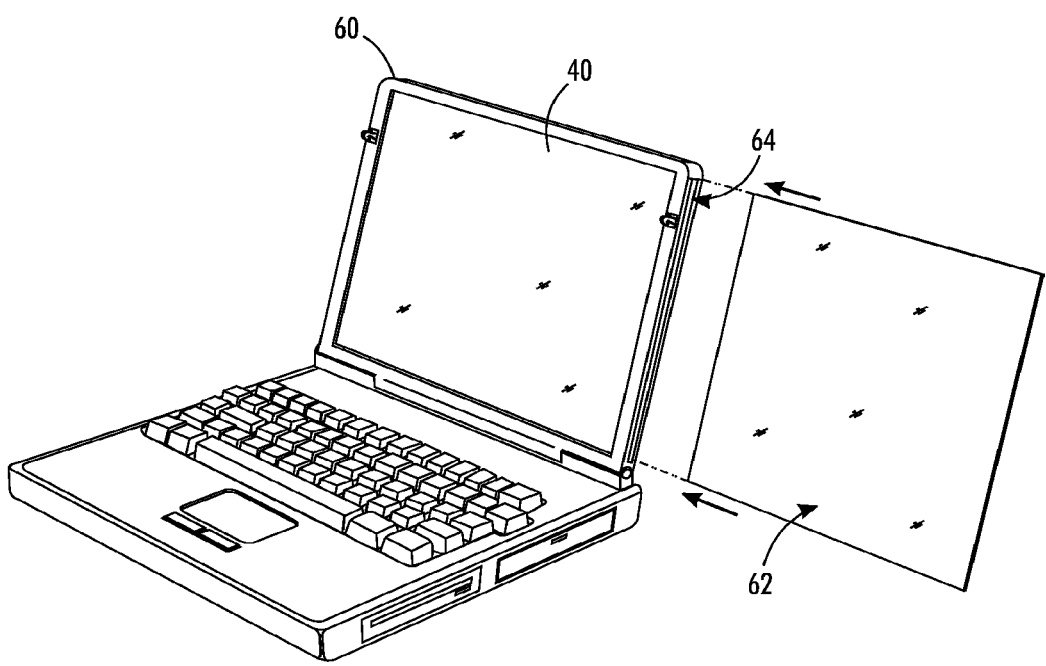
FIG. 5 is a perspective view of a device with a polarizing layer removed and replaced by a separate polarizing layer that can be temporarily aligned with the display to reveal an image.

FIG. 5 illustrates another embodiment operating under similar principles. A device 60, such as a PDA (personal digital assistant), incorporates a similar modified LCD display 40 and a separate polarizing layer 62, which is removable at will. The polarizing layer 62 can be removed and replaced through a slot 64, for example, whenever there is a need to view images with the LCD display 40. The considered LCD display 40 can be a reflective (front-lit), a transmissive (back-lit), or a transitional (hybrid) LCD display, and the replaceable polarizing layer 62 can be located on either side of the liquid crystal layer 44.

Polarizing layer 62 can also be a part of a separate handheld viewer or a part of a head-mounted viewer. For example, the polarizing layer 62 can be adhered to a lens or other optic or can be incorporated into a lens or other optic such as may be used for eyeglasses, orientable contact lenses, or other optical aids (e.g., sunglasses) with or without refractive power.

All of the above devices can be arranged to support the selective viewing of information displayed on a LCD display 40. Such selective viewing can be advantageous for security or privacy purposes. The LCD displays are missing a polarizing layer that can be supplied separately for enabling the displays. For purposes of security, the removal or omission of the inner polarizing layer adjacent to the backlit light source or front-lit reflective surface would be particularly effective because external polarizers would not reveal the image pattern encoded by relative rotations within the liquid crystal layer. A replacement polarizing layer is needed for straddling the liquid crystal layer in front of the light source or reflective surface.

Figure 6:
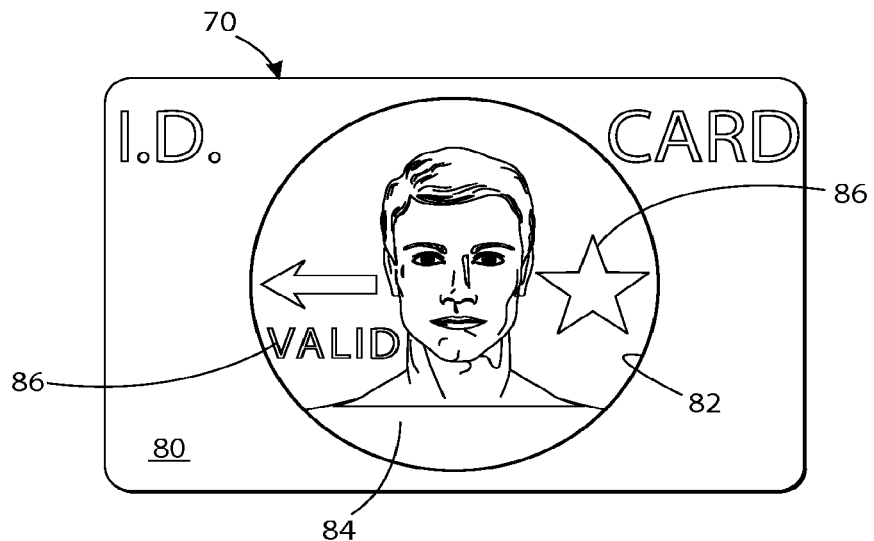
FIG. 6 is a front view of a secure identification card with polarization sensitive security features.
Figure 7:
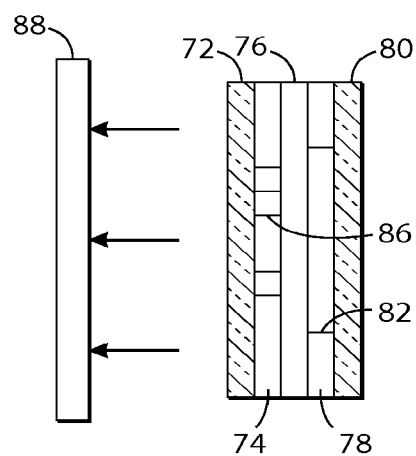
FIG. 7 is side view of the secure identification card of FIG. 7 showing a polarized light source and layers of the card that are exaggerated in thickness for viewing on the page.

A secure ID card 70 as shown in FIGS. 6 and 7 also exploits polarization effects for authenticating the secure card 70 in accordance with another embodiment of the invention. Operative layers of the card 70 can be sandwiched between front and back lamination layers 72 and 80. At least one or both of the lamination layers 72 and 80 are preferably clear (transmissive) or at least translucent. However, one of the lamination layers e.g., 72 can include a reflective surface so that light enters and exits the card 70 through the other lamination layer e.g., 80. For example, the lamination layers 72 and 80 can be made of glass or plastic.

Printed layer 78 contains text and graphics along with a window 82 through which other layers of the card 70 are visible. Within the window, an image 84 is printed. A polarizing layer 76 beneath the printed layer substantially restricts the passage of light to a designated polarization, preferably an oriented linear polarization. A retarder layer 74 composed of variously shaped and oriented birefringent materials differentially affects the polar organization of light at different wavelengths. For producing latent images 86 in the form of text or graphics, the birefringent materials can be printed or cut out in different shapes and affixed in the same or different (e.g., mixed) orientations with respect to a birefringent axis of the films. One or more additional retarder layers (not shown) can be used to change the overall thickness of the birefringent films locally with respect to particular text or graphics 86 or more generally across a plurality of the text or graphics 86. Such birefringent materials are available as conventional Mylar tapes and clear films that exhibit significant amounts of directional anisotropy.

Shown in a location behind the secure ID card 70 is a polarized light source 88, which can be in the form of a LCD display or a conventional light source together with a polarizer, such as the visual aid 50. Starting with linearly polarized light from the polarized light source 88, the retarder layer 74 locally converts the linearly polarized light into other polarization forms, such as circular or elliptical polarization. The polarization effects of the retarder layer 74 are preferably spectrally sensitive so that different visible wavelengths are affected differently. The resulting effect of the retarder layer 74 is either to allow light through the polarizing layer 76 that would otherwise not have passed or to attenuate light that would otherwise have passed through the polarizing layer 76. With the polarization effects being wavelength sensitive, different colors of light are preferentially passed through the polarizing layer 76, rendering the text or graphical forms within the retarder layer 74 visible at the surface of the secure card 70.

In place of or in addition to the laminating layer 72, a reflective layer (not shown) can be affixed to the secure card 70 adjacent to the retarder layer 74. Although additional intervening layers can be used, the intended optical pathway for viewing the latent images embedded in the alternative secure card involves light propagating through the polarizing layer 76 and the retarder layer 74, reflecting from the reflective layer, and returning through the retarder layer 74 and the polarizing layer 76 for viewing. Any changes in the polarization of the light imparted by the retarder layer 74 differentially filter the light upon the second encounter with the polarizing layer 76.

Figure 8:
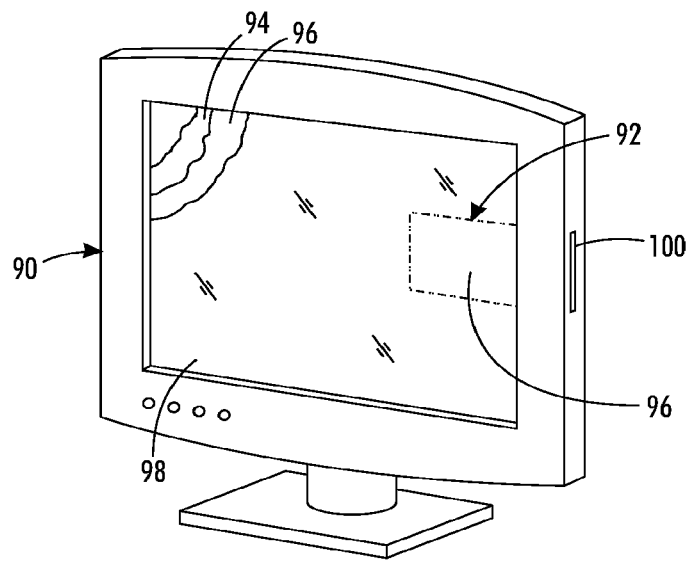
FIG. 8 is a perspective view of an LCD display screen having a secure area and a peripheral slot for inserting a pair of polarizing films into the secure area.

A modified LCD computer display 90, as shown in FIG. 8, includes a designated area 92, which is modified by the removal of overlapping portions of an inner polarizer 94 and outer polarizer 98 that straddle an addressable liquid crystal layer 96 of the display 90. A slot 100 provides access to the space evacuated by the removal of the overlapping portions of the inner and outer polarizers 94 and 98 within the designated area 92. Although the liquid crystals of the liquid crystal layer 96 remain addressable with the designated area 92, no images are formed within the designated area 92 because the light acted upon by the liquid crystals is unpolarized light.

Figure 9:
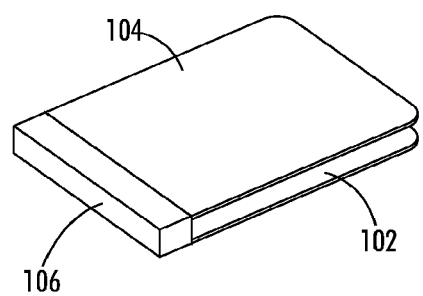
FIG. 9 is a perspective view of a polarizer key having a pair of polarizing films shaped for inserting the polarizing films through the slot of the display screen of FIG. 8 for activating the secure area of the display.

As shown in FIG. 9A, a paired set of polarizers 102 and 104 are coupled together by a bow 106 and shaped in the form of blades for insertion through the slot 100 into the positions originally occupied by the removed portions of the inner and outer polarizers 94 and 98. The polarization characteristics of the paired polarizer blades 102 and 104, including the relative orientation of their polarization axes, are matched to the polarization characteristics of the inner and outer polarizers 94 and 98 of the display 90. When inserted into position, straddling the liquid crystal layer 96 within the designated area 92, the paired polarizer blades 102 and 104 contribute to forming images within the designated area 92, thus restoring the display 90 close to its original operational form. Preferably, a computer controlled program places the secure information in the designated area 92 of the screen so as to hide the secure information until the paired polarizer blades 102 and 104 restore the display 90 to its operational form.

The paired polarizer blades 102 and 104 can be uniquely shaped or supported by the bow 106, which can also have a unique shape, and related to a corresponding unique shape of the slot 100 to limit insertion of the paired polarizer blades 102 and 104 to one or more designated displays. For example, bow 106 could be shaped to match a countersunk shape of the slot 100. The mating shapes of the bow 106 and slot 100 could also be used to hide the presence of the bow 106. The slot 100 could also be covered by door similar to the doors used for accessing DVDs and CDs. Entrance of the polarizer blades 102 and 104 into the slot 100 could be used to trigger a loading mechanism for moving the polarizer blades 102 and 104 into their operative position within the display 116. Similar assistance could be used for removing the polarizer blades 102 and 104. The triggering mechanism could also be made sensitive to one or more characteristics of the polarizer blades 102 and 104, such as their shape, to deny access to blades not having the requisite characteristics. The two polarizer blades 102 and 104 supported by the bow 106 form a polar key that can be stored separately from the display 116 and maintained under the control of a user granted access to the secure information presented within the designated area 92 of the display 116.

Thus, access can be limited to information arranged for display 90 within the designated area 92 to the paired polarizer blades 102 and 104 and bow 106 that function as a key for unlocking information within the designated area 92. Such key-type access could also be electronically controlled. For example, the bow 106 could be embedded with a key chip that must be sensed by the display 90 to permit access through the slot 100 for restoring function to the designated area 92 of the display 90.

Instead of removing portions of both the inner and outer polarizers 94 and 98 for temporarily disabling the designated area 92 of the display 90, a portion of just one or the other of the inner and outer polarizers 94 and 98 could be removed. For example, a portion of just the inner polarizer 94 could be removed so that the front of the display is unaffected by the change.

As shown in FIG. 9B, just one of the polarizer blades 102, which corresponds to the removed portion of the polarizer 94, is mounted on the bow 106 for insertion through the slot 100 as a polar key for unlocking (i.e., revealing) information within the designated area 92. The single polarizer blade design could also be adapted similar to the paired polarizer blade design to limit access into the display 116 to polarizer blades having the requisite characteristics. A similar electronic key function could also be incorporated into the bow 106 supporting the single polarizer blade 102 to provide an extra or alternative form of security.

Figure 10:
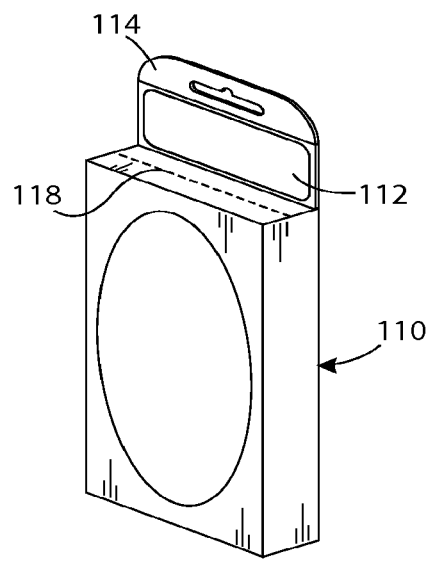
FIG. 10 is a perspective view of a product packaging box modified to include a polarizer.
Figure 11:
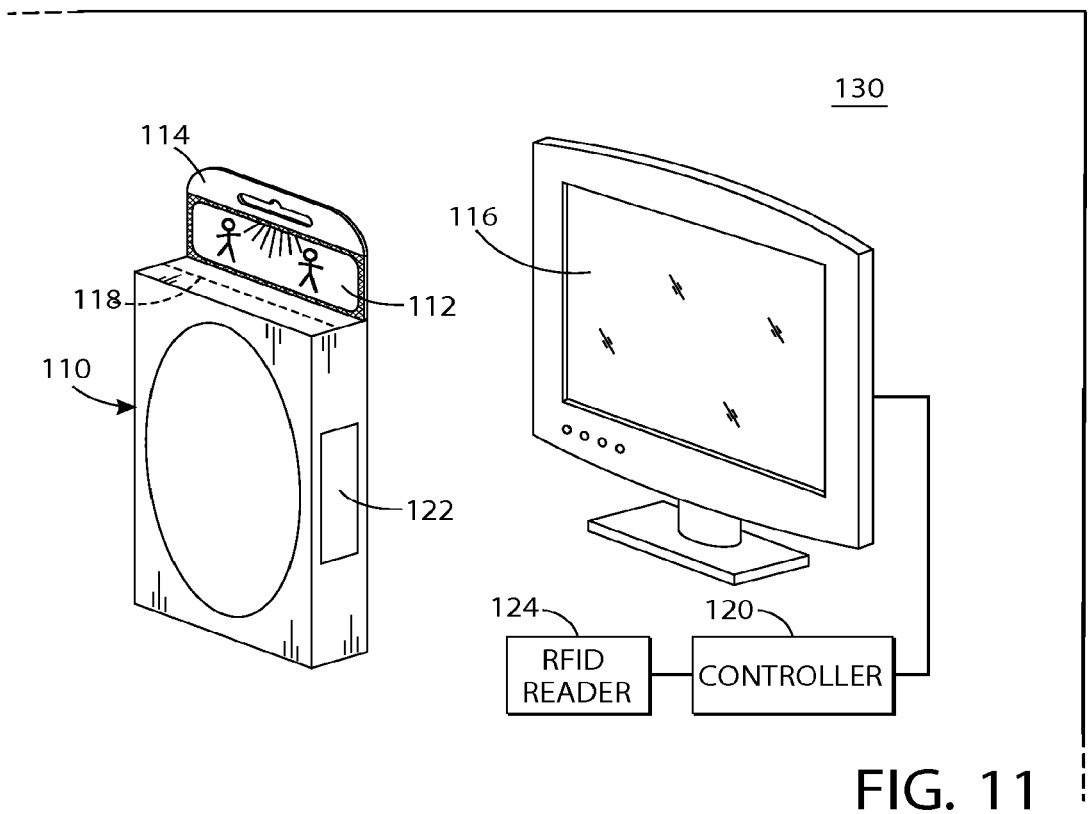
FIG. 11 is a similar perspective view showing the modified product packaging box together with a LCD display monitor modified by the removal of a comparable polarizer on the display screen.

A product packaging 110, as shown in FIGS. 10 and 11, incorporates a polarizer 112 within a hanging flap 114. A video driven LCD display 116, as shown in FIG. 11, is modified by the removal (or omission) of all or a portion of an outer polarizer adjacent to the front 118 of the LCD display 116. The polarizer 112 preferably matches the outer polarizer removed from the LCD display 116. For example, if the polarizer removed (or omitted) from the LCD display 116 is a linear polarizer, then the polarizer 112 is also preferably a linear polarizer with a similarly oriented polarization axis. However, the polar orientation of the polarizer 112 preferably differs from the customary polar orientation of polarized sunglasses, so that polarized sunglasses would not provide an appropriate substitute for the polarizer 112 to complete the LCD display 116.

Both the product packaging 110 with the polarizer 112 and the modified LCD display 116 are preferably located in or near a retail or promotional space 130 within which other similarly packaged products are on display for sale or promotion. The LCD display 116 preferably receives a video signal on an ongoing basis or in response to a sensor signal, such as a proximity sensor. Speakers, not shown, can also be used to broadcast an accompanying sound track. With the removal (or omission) of the display's front polarizer, no images appear within the modified display 116. That is, even though image information is encoded within one of the polarizations emitted from the display 116, the image information is largely obscured by a lack of contrast because of the presence of a complementarily encoded orthogonal polarization. As a result, the display 116 appears to emit light (e.g., white light) undifferentiated in color or intensity by the polarization effects of the liquid crystal layer.

Directions 118 printed on the package 110 can be used to instruct the customer where and how to hold the package 110 in front of the display screen 116 to receive audio and video portions of the message. In accordance with these instructions, a customer can pick up the modified product packaging 110 and look through the polarizer 112 toward the display 116 to view the image information differentially encoded between polarizations. The polarizer 112 effectively completes the display 116 so that the contents of the display 116 are visible to the customer. Thus, the customer, while holding a product package 110 intended for sale, can be exposed to a marketing message optically encoded by the display 116 and revealed through the polarizer 112, which completes the display 116. Only customers holding packages incorporating the requisite polarizer 112 can view the message of the display 116.

Interactive features can be incorporated into a controller 120 for the display 116 supporting communications between the customer and a marketing program. For example, the display 116 could include a touch responsive screen to accept input from the customer and adjust the marketing message to the instant customer.

FIG. 11 also shows an RFID tag 122 affixed to the package 110. However, the RFID tag 122 or at least its RFID antenna is preferably mounted within the package 110 or embedded within or between layers of the package 110 so that the RFID antenna remains hidden and protected from abuse. The RFID tag 122 can be poled by an RFID reader 124 associated with the controller 120 to influence operation of the display 116 in response to the signal received by the reader 124. For example, detection of the RFID tag 122 can be used as a trigger to turn on the display 116, initiate a particular video message, or further cycle a video message. Differently encoded RFID tags 122 can be mounted within different product packages incorporating similar polarizers. The video messages can be adapted or completely changed to match the video messages to the different products. With a single or fewer displays than product types, a control algorithm can be used to play the video messages in a responsive order, such as by order of arrival of the RFID embedded packages within a prescribed zone near the LCD display 116. The presence of more than one product of a type associated with a single message can be accommodated by cycling the same video message to assure that all customers holding the product view the entire message from start to finish. More than one message can be associated with the same product to maintain interest. In addition, more than one display can be mounted with the display or promotional area or different portions of the display 116 can be separately controlled to present different messages at once.

Although the polarizer 112 is shown mounted within the window of a hanging flap 114 of the product package 110, similar polarizers can be mounted on or otherwise incorporated into product packaging in other ways. Preferably, even if mounted flush to the package, the polarizer 112 can be reoriented as a working window for viewing the display 116 without significantly damaging the product packaging or becoming detached from the product packaging. Thus, the product packaging preferably remains in condition for sale despite being previously used by one or more customers for viewing the display 116. In addition to mounting a polarizer in product packaging, the polarizer could be mounted in other branded items including advertizing material, other promotional items, including coupons, adjacent to a product display or other marketing center. The modified displays are also preferably located at or near the product displays or marketing centers within view of where customers pick of the modified product packaging or modified advertizing materials.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as may be claimed.

The invention claimed is:

1. A promotional display system comprising:
   a liquid crystal display having at least a portion of a polarizing layer missing from the display to disable the corresponding portion of the display;
   a branded item incorporating a polarizing layer through which a customer can view the liquid crystal display while holding the branded item wherein the branded item is independent and separate from the liquid crystal display and wherein the branded item also incorporates an RFID tag and further comprising an RFID tag reader associated with the display for prompting the generation of the video images linked to the reading of the RFID tag; and
   the polarizing layer of the branded item having polarization characteristics that enable the customer to view video images generated within the corresponding portion of the display.

2. The display system of claim 1 in which the branded item includes a product package and the polarizing layer is mounted within a portion of the product package.

3. The display system of claim 1 in which the branded item includes a promotional item related to a product and the polarizing layer is mounted within a portion of the promotional item.

4. The display system of claim 1 in which the branded item is one of a plurality of a branded items incorporating polarizing layers through which one or more customers can view the liquid crystal display while holding the branded items.

5. The display system of claim 4 in which each of the branded items also incorporates the RFID tag and further comprising the RFID tag reader associated with the display for prompting the generation of the different video images linked to the reading of different ones of the RFID tags.

6. A liquid crystal display having a portion designated for secured access comprising:
   a frame;
   a polarizing layer overlapping a limited portion of a locally addressable liquid crystal layer within the frame for enabling the generation of the images within a corresponding limited portion of the display;
   a remaining portion of the locally addressable liquid crystal layer within the frame being devoid of the overlapping polarizing layer for temporarily disabling the generation of images within a corresponding remaining portion of the display;
   a separate polarizing layer being shaped as a blade; and
   a slot formed in the frame for receiving the blade in a position overlapping the remaining portion of the locally addressable liquid crystal layer for enabling the generation of images within the remaining portion of the display.

7. The display of claim 6 in which the blade is attached to a bow for handling the blade.

8. The display of claim 7 in which the blade and bow form a key and the slot forms a keyway complementary to the key for limiting access through the slot to keys having a similar form.

9. The display of claim 7 in which a key chip is embedded in the bow and a chip sensor is associated with the display to prevent the limited portion of a locally addressable liquid crystal layer from participating in the formation of images within the remaining portion of the display unless the key chip is sensed.

10. A method of promoting products comprising the steps of:
    providing a liquid crystal display having at least a portion of a polarizing layer missing from the display to disable the corresponding portion of the display;
    incorporating a polarizing layer within a branded item a branded item through which a customer can view the liquid crystal display while holding the branded item wherein the branded item is independent and separate from the liquid crystal display and wherein the branded item incorporates an RFID tag and associating an RFID tag reader with the display for prompting the generation of the video images linked to the reading of the RFID tag; and
    relating the polarizing layer within the branded item to the polarizing layer missing from the display to enable the customer to view video images generated within the corresponding portion of the display.

11. The method of claim 10 in which the step of incorporating includes mounting the polarizing layer within a portion of a product package.

12. The method of claim 10 in which the step of incorporating includes mounting the polarizing layer within a portion of a promotional item.

13. The method of claim 10 wherein incorporating the polarizing layer and incorporating the RFID tag within a branded item include incorporating polarizing layers and RFID tags within a plurality of branded items and the step of associating the RFID tag reader with the display includes generating different video images linked to the reading of different ones of the RFID tags.

14. A method of providing secure access to a limited portion of a liquid crystal display comprising steps of:
    providing a polarizing layer that (a) overlaps a limited portion of a locally addressable liquid crystal layer within the frame for enabling the generation of the images within a corresponding limited portion of the display and (b) does not overlap a remaining portion of the locally addressable liquid crystal layer within the frame for temporarily disabling the generation of images within a corresponding remaining portion of the display;
    providing a separate polarizing layer being shaped as a blade; and
    forming a slot in the frame for receiving the blade in a position overlapping the remaining portion of the locally addressable liquid crystal layer for enabling the generation of images within the remaining portion of the display.

15. The method of claim 14 including a step of attaching a bow to the blade for forming a key and the step of forming the slot includes forming the slot as a keyway complementary to the key for limiting access through the slot to keys having a similar form.

16. The method of claim 14 including steps of attaching a bow to the blade for handling the blade, embedding a key chip in the bow, and associating a chip sensor with the display to prevent the limited portion of a locally addressable liquid crystal layer from participating in the formation of images within the remaining portion of the display unless the key chip is sensed.

* * * * *